United States Patent
Kim et al.

(10) Patent No.: US 11,160,262 B2
(45) Date of Patent: Nov. 2, 2021

(54) BAIT CAST REEL HAVING LOCKING PART FOR HINGE-TYPE PALMSIDE COVER

(71) Applicant: BANAX CO., LTD., Incheon (KR)

(72) Inventors: Sung Jin Kim, Incheon (KR); Yu Geun Kim, Incheon (KR)

(73) Assignee: BANAX CO., LTD., Lncheon (KR)

( * ) Notice: Subject to any disclaimer, the term of this patent is extended or adjusted under 35 U.S.C. 154(b) by 92 days.

(21) Appl. No.: 16/659,685

(22) Filed: Oct. 22, 2019

(65) Prior Publication Data
US 2020/0253179 A1  Aug. 13, 2020

(30) Foreign Application Priority Data

Feb. 8, 2019 (KR) .......................... 10-2019-0014899

(51) Int. Cl.
*A01K 89/01* (2006.01)
*A01K 89/016* (2006.01)
*A01K 89/033* (2006.01)
*A01K 89/015* (2006.01)

(52) U.S. Cl.
CPC ...... *A01K 89/016* (2013.01); *A01K 89/01928* (2015.05); *A01K 89/045* (2015.05)

(58) Field of Classification Search
CPC ........ A01K 89/01557; A01K 89/01922; A01K 89/01923; A01K 89/0193; A01K 89/016
See application file for complete search history.

(56) References Cited

U.S. PATENT DOCUMENTS

| | | | | |
|---|---|---|---|---|
| 5,577,680 A | * | 11/1996 | Ikuta ................. | A01K 89/015 242/313 |
| 6,481,657 B1 | * | 11/2002 | Oishi ............... | A01K 89/01557 242/289 |
| 2005/0224617 A1 | * | 10/2005 | Nakagawa ....... | A01K 89/01922 242/310 |
| 2016/0345562 A1 | * | 12/2016 | Baldwin .......... | A01K 89/01922 |

FOREIGN PATENT DOCUMENTS

| | | |
|---|---|---|
| JP | 2005323586 A | 11/2005 |
| JP | 2006246776 A | 9/2009 |
| KR | 200426604 Y1 | 9/2006 |
| KR | 10-0684212 | 2/2007 |
| KR | 101418029 B1 | 7/2014 |

OTHER PUBLICATIONS

Office Action issued by the Korean Intellectual Property Office (KIPO) dated Aug. 19, 2020 concerning the corresponding KR patent application 10-2019-0014899.
Decision to Grant a Patent issued by the Korean Intellectual Property Office (KIPO) dated Apr. 21, 2021 concerning the corresponding KR patent application 10-2019-0014899.

* cited by examiner

*Primary Examiner* — Emmanuel M Marcelo
(74) *Attorney, Agent, or Firm* — The Dobrusin Law Firm, P.C.

(57) ABSTRACT

Present disclosed is a bait cast reel having a locking part for a hinge-type palm side cover, the palm side cover being hinged to a first side opening of a frame of a reel body to rotatably support one end of a spool shaft. The bait cast reel includes: a reel body in which a spool is rotatably provided; a palmside cover fixed to an outside end of a pillar insert; a spool cover mounted to the palmside cover; a centrifugal brake controls a rotation speed of the spool; a pillar click gear to which the pillar insert is coupled in a moveable manner; a pillar click claw stopping rotation of the pillar

(Continued)

click gear; and a stopper supporting the pillar click gear for rotation thereof.

8 Claims, 6 Drawing Sheets

BAIT CAST REEL HAVING LOCKING PART FOR HINGE-TYPE PALMSIDE COVER

CROSS REFERENCE TO RELATED APPLICATION

The present application claims priority to Korean Patent Application No. 10-2019-0014899, filed Feb. 8, 2019, the entire contents of which is incorporated herein for all purposes by this reference.

BACKGROUND OF THE INVENTION

Field of the Invention

The present disclosure relates generally to a bait cast reel. More particularly, the present disclosure relates to a bait cast reel having a locking part for a hinge-type palmside cover. Wherein the palmside cover is hinged to a first side opening of a frame of a reel body for opening and closing and rotatably supports one end of a spool shaft.

Description of the Related Art

Unless otherwise indicated in the present disclosure, descriptions in this section are not the related art to the claims of the application, and inclusion in this section is not admitted to be the related art.

Generally, in the case of fishing (fly fishing, lure fishing) using a bait cast reel that uses an artificial bait and releases a fishing line by casting, a user throws a fishing line with an artificial bait in a state of holding a reel body together with a fishing rod, the reel body being mounted on the fishing rod.

At the beginning of the casting, a spool begins to be rotated by a casting force generated by a weight of the artificial bait (bait), and after a falling point of the bait, that is, after a peak of a parabolic motion, speed of releasing the fishing line should be significantly reduced. However, the spool having its own weight is continuously rotated at high speed by an inertial force, thereby causing backlash in which the fishing line is instantaneously tangled inside the spool.

Meanwhile, a method of preventing backlash during casting may be difficult for a beginner. Therefore, a magnet braking method using eddy current generated by a magnet has been used.

Figure 1:
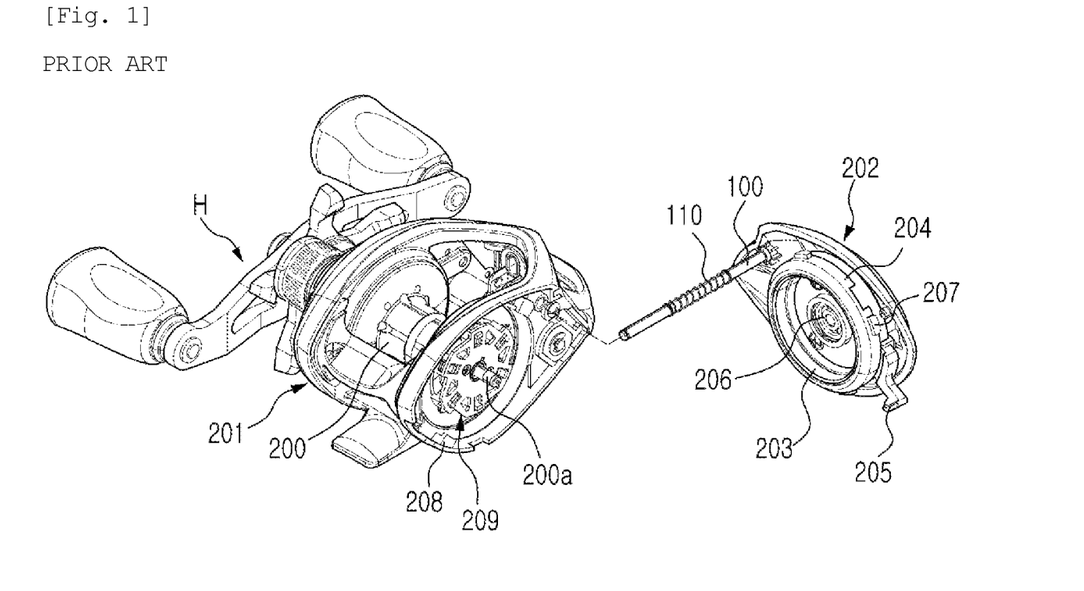
FIG. 1 is a view showing schematically a bait cast reel according to a related art.

As shown in FIG. 1, a conventional bait cast reel includes a reel body 201 in which a spool 200 on which a fishing line is wound/unwound is rotatably installed by a spool shaft 200a coupled to a bearing (not shown).

The bait cast reel includes a palmside cover 202 hinged to the reel body 201 by a shaft-shaped pillar insert 100 to open and close a first side opening of the reel body 201.

The bait cast reel includes a side cover mounted to a second side opening of the reel body 201.

The bait cast reel includes a spool cover 204, wherein the spool cover 204 is rotatably mounted to the palmside cover 202 within a desired angle, has a brake ring 203 therein, and has a bearing 206 at the center thereof to support the spool shaft 200a.

When a lock lever 205 protruding from an outside surface of the spool cover 204 is rotated, a locking step 207 formed at an outer circumferential edge of the spool cover 204 is locked to and released from a locking step 208 that is formed inside the reel body 201 to correspond to the locking step 207. Thus, the palmside cover 202 may be opened and closed with respect to the reel body 201.

Accordingly, the palmside cover 202 that is rotatably provided in the reel body 201 may be separated from the reel body 201, when backlash occurs during casting, when the spool 200 is removed from the reel body 201 for replacing a fishing line, or when a brake force of a centrifugal brake 209 provided at a first side flange of the spool 200 is controlled.

The centrifugal brake 209 is commonly used in the technical field to which the present disclosure belongs, and thus the detailed description thereof will be omitted.

When the above-described lock lever 205 is rotated at a desired angle to be moved to an opening position, the locking step 207 formed at the outer circumferential edge of the spool cover 204 is released from the locking step 208 formed inside the reel body 201.

The palmside cover 202 may be separated from the first side opening of the reel body 201 by being moved therefrom in a direction of a shaft of the reel body 201, by an elastic restoring force of an elastic member 110 provided at an outer circumferential surface of the pillar insert 100 that allows the palmside cover 202 to be hinged to the reel body 201.

As described above, when the spool 200 is removed from the reel body 201 during fishing or when the palmside cover 202 is separated from the reel body 201 for controlling the brake force of the centrifugal brake 209 of the palmside cover 202, the palmside cover 202 is rotated freely on the pillar insert 100. In this case, there is interference that the spool 200 is removed from the reel body 201, thus causing inconvenience to the user.

Accordingly, a bait cast reel having a locking part for a hinge-type palmside cover has been required, by locking the palmside cover 202 at a desired position (or desired angle) to facilitate mounting of the spool 200 to the reel body 201 and to prevent interference in brake force control of the centrifugal brake 209, when the palmside cover 202 hinged to the reel body 201 of the bait cast reel is separated from the reel body 201.

Korean Patent No. 10-0684212 discloses a detachable apparatus for couple of bait casting reel cover.

SUMMARY OF THE INVENTION

Accordingly, the present disclosure has been made keeping in mind the above problems occurring in the related art, and an embodiment of the present disclosure is intended to propose a bait cast reel having a locking part for a hinge-type palmside cover. Wherein the palmside cover that is openable from a frame of a reel body may be locked at a desired position by a user, so that a spool may be easily attached in and detached from the frame and a brake force of a centrifugal brake (not shown) may be easily controlled.

Another objective of the embodiment of the present disclosure is to provide a bait cast reel having a locking part for a hinge-type palmside cover. Wherein, when the palmside cover is opened from the frame and then is rotated, the palmside cover may be locked at every position desired by the user.

A further objective of the embodiment of the present disclosure is to provide a bait cast reel having a locking part for a hinge-type palmside cover. Wherein, when the palmside cover is opened or closed with respect to the frame, only a shaft-shaped pillar insert is moved in a direction of a shaft of the reel body in a predetermined section, so that interference portion with an opposite component may be minimized.

In order to achieve the above object, according to an embodiment of the present disclosure, there is provided a bait cast reel having a locking part for a hinge-type palmside cover, the bait cast reel includes: a reel body in which a spool on which a fishing line is wound/unwound is rotatably provided; a palmside cover fixed to an outside end of a pillar insert that is rotatably coupled to the reel body and is moved in a direction of a shaft of the reel body, the palmside cover being hinged to the reel body to open and close a first side opening of the reel body; a spool cover that is mounted to the palmside cover and has a brake ring therein; a centrifugal brake that is integrally coupled to a spool shaft and controls a rotation speed of the spool by a plurality of brake shoes that is moved radially by a centrifugal force, which is generated when the spool is rotated, to come into contact with the brake ring; a pillar click gear to which the pillar insert is coupled in a moveable manner in the direction of the shaft of the reel body, the pillar click gear being rotatably mounted to an inside plate of the reel body integrally with the pillar insert; a pillar click claw that is mounted to the inside plate of the reel body and stops rotation of the pillar click gear so that the palmside cover that is separable from the first side opening of the reel body is rotated and then locked at a desired position; and a stopper that is mounted to the inside plate of the reel body to support the pillar click gear for rotation of the pillar click gear, wherein, when the palmside cover coupled to the first side opening of the reel body is locked, the stopper prevents the pillar click gear from escaping from a fixed position.

In order to achieve the above object, according to another embodiment of the present disclosure, there is provided a bait cast reel having a locking part for a hinge-type palmside cover, the bait cast reel may include: a reel body in which a spool on which a fishing line is wound/unwound is rotatably provided; a palmside cover that is moved in a direction of a shaft of the reel body, is fixed to an outside end of a pillar insert rotatably coupled to the reel body, and is hinged to the reel body to open and close first side opening of the reel body; a spool cover that is mounted to the palmside cover and has a brake ring therein; a centrifugal brake that is integrally coupled to a spool shaft and is for controlling a rotation speed of the spool by a plurality of brake shoes that is moved radially by a centrifugal force, which is generated when the spool is rotated, to come into contact with the brake ring; a pillar locker to which the pillar insert is coupled in a moveable manner in the direction of the shaft of the reel body and the pillar locker rotatably mounted to an inside plate of the reel body integrally with the pillar insert; a locking plate that is mounted to the inside plate of the reel body and stops rotation of the pillar locker so that the palmside cover that is separable from the first side opening of the reel body is rotated and then locked at a desired position; and a stopper that is mounted to the inside plate of the reel body to support the pillar locker for rotation of the pillar locker, wherein, when the palmside cover coupled to the first side opening of the reel body is locked, the stopper prevents the pillar locker from escaping from a fixed position.

According to the embodiments of the present disclosure, the bait cast reel having the locking part for the hinge-type palmside cover with the above-described configuration has advantages as follows.

The palmside cover hinged to the reel body to open and close the opening of the frame can be locked at the desired position (or desired angle) by the user. Accordingly, the spool in the frame can be easily attached to and detached from the reel body when backlash occurs or a fishing line is replaced, and it is possible to provide convenience to the user as the brake force of the centrifugal brake (not shown) is controlled.

When the palmside cover is opened from the frame and then is rotated, the palmside cover can be locked at the user's desired position and the user can check that the palmside cover is rotated as a click sound is generated during rotation.

When the palmside cover is opened or closed with respect to the frame, only the shaft-shaped pillar insert is moved in the direction of the shaft of the reel body in the predetermined section. Accordingly, as the interference portion with the opposite component (pillar click gear coupled to pillar insert or pillar locker of cam shape) is minimized, it is possible to form the frame compact and small since a separate space is not required.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, a bait cast reel having a locking part for a hinge-type palmside cover according to exemplary embodiments of the present disclosure will be described in detail with reference to the accompanying drawings.

Referring to FIGS. 2 to 6, the bait cast reel having the locking part for the hinge-type palmside cover according to an embodiment of the present disclosure includes components as follows.

First, the bait cast reel includes a reel body 11 (or frame) in which a spool 10 on which a fishing line is wound/unwound is rotatably installed by a bearing 35 supporting a spool shaft 10*a*.

Next, the bait cast reel includes a palmside cover 13. The palmside cover 13 is fixed to an outside end of a shaft-shaped pillar insert 12 that is rotatably coupled to the reel body and is moved in a direction of a shaft of the reel body 11, and the palmside cover 13 is hinged to the reel body 11 to open and close a first side opening 11*a*. In addition, the palmside cover 13 has a bearing 13*b* at the center thereof so as to rotatably support an outside end of the spool shaft 10a and has a spool cover 13a therein. Wherein the spool cover 13a has a locking step 41, which is detachably locked to and released from a locking step (now shown) of an outside plate 24 of the reel body 11, at an outer circumferential edge of the spool cover 13a in a circumferential direction thereof, when the palmside cover 13 is rotated by a desired angle by manipulating a locking lever 40 extending from the outer circumferential edge of the spool cover 13a.

The bait cast reel includes a brake ring 36 that is provided inside the spool cover 13a mounted to the palmside cover 13.

The bait cast reel includes a centrifugal brake (not shown). The centrifugal brake is integrally coupled to the spool shaft 10a in a spline manner and is moved radially outward (in direction away from spool shaft 10a) by a centrifugal force generated when the spool 10 is rotated. Thus, as the brake ring 36 comes into contact with a plurality of brake shoes (not shown), the centrifugal brake controls a rotation speed of the spool 10 by a friction force between the brake ring 36 and the brake shoes.

The bait cast reel includes a pillar click gear 15. Wherein, the pillar insert 12 is movably coupled to the pillar click gear 15 to be moveable in a direction of a shaft of the reel body. The pillar click gear 15 is rotatably mounted to an inside plate of the reel body 11 integrally with the pillar insert 12.

The bait cast reel includes a pillar click claw 16. The pillar click claw 16 is mounted to the inside plate 14 and stops rotation of the pillar click gear 15, so that the palmside cover 13 that is separable from the first side opening 11a of the reel body 11 is rotated and then locked at a desired position.

The bait cast reel includes a stopper 17 mounted to the inside plate 14 to support the pillar click gear 15 for rotation of the pillar click gear 15. When the palmside cover 13 coupled to the first side opening 11a of the reel body 11 is locked by manipulating the locking lever 40, the stopper 17 may prevent the pillar click gear 15 from escaping from a fixed position.

According to the exemplary embodiment, the bait cast reel includes a retainer 18 (or E-ring). The retainer 18 is mounted to an inside end of the pillar insert 12. When the palmside cover 13 is separated from the first side opening 11a of the reel body 11, the retainer 18 prevents the pillar insert 12 from escaping from the inside plate 14.

The bait cast reel includes a side cut portion 19 formed at one side of an outer circumferential surface of the pillar insert 12;

The bait cast reel includes a flat portion 20 that is formed at an inner circumferential surface of the pillar click gear 15 to correspond to the side cut portion 19.

The pillar click claw 16 includes a locked portion 21 mounted to the inside plate 14 and a tension portion 22 that extends from one end of the locked portion 21 in a U-shape and is elastically deformed to be attached to and detached from between gear teeth of the pillar click gear 15 by rotation of the palmside cover 13.

When the palmside cover 13 that is separable from the first side opening 11a of the reel body 11 is rotated, a click sound is generated every time the tension portion 22 of the pillar click claw 16 is attached to and detached from between the gear teeth of the pillar click gear 15.

The bait cast reel includes a first receiving groove 23 formed at the inside plate 14 to receive the pillar click gear 15, the pillar click claw 16, and the stopper 17. Thus, it is possible to minimize interference with the pillar click gear 15, the pillar click claw 16, and the stopper 17, when a side cover (now shown) having a tension control knob for controlling a tension force of the spool 10 is mounted to the inside plate 14.

The centrifugal brake (not shown), which is for controlling the rotation speed of the spool by the friction force when the brake shoes are moved radially by the centrifugal force generated when the spool 10 is rotated and comes into contact with the brake ring 36 formed inside the spool cover 13a, is a technical description commonly used in the technical field to which the present disclosure belongs, and thus a detailed description thereof will be omitted.

A length (L) of the side cut portion 19 formed at the pillar insert 12 is a size of adding a thickness (a) of the pillar click gear 15 coupled to the pillar insert 12 and a gap (b) corresponding to a perpendicular distance between an edge of the palmside cover 13 and an edge of the outside plate 24 of the reel body 11 in a state when the palmside cover 13 is separated from the first side opening 11a of the reel body 11 (L+a+b).

When the length (L) of the side cut portion 19 is larger than the size of adding the thickness (a) of the pillar click gear 15 and the gap (b) corresponding to the perpendicular distance between the edge of the palmside cover 13 and the edge of the outside plate 24 (L > (a+b)), when a user reels a fishing line onto the spool 10 by rotating a handle, there is interference in a reciprocating movement of a level winder (not shown) that aligns a fishing line by performing the reciprocating movement along the pillar insert 12.

In the drawings, an un-described component 30 is an elastic member (in which compression coil spring is used). The elastic member is provided at an outer circumferential surface of the pillar insert 12 between the edge of the palmside cover 13 and the edge of the outside plate 24 of the reel body 11. The elastic member separates the palmside cover 13 from the reel body 11 in the direction of the shaft of the reel body by an elastic restoring force, when a locking unit of the palmside cover 13 is released by the rotation of the locking lever (not shown).

Hereinbelow, an operational example of the bait cast reel having the locking part for the hinge-type palmside cover 13 according to the embodiment of the present disclosure will be described with reference to the accompanying drawings.

As shown in FIGS. 2 to 6, when the spool 10, which is rotatably installed inside the reel body 11 and on which a fishing line wound/unwound by being rotated during fishing, is replaced, or when a brake force of the centrifugal brake (not shown) provided at a first side flange (not indicated with reference numeral) of the spool 10 is controlled, the palmside cover 13 may be separated from the first side opening of the reel body 11.

When the locking lever 40 famed at the spool cover 13a of the palmside cover 13 is manipulated to be moved to a unlock position, the locking unit that is provided at each of the outside plate 24 of the reel body 11 and the spool cover 13a of the palmside cover 13 that correspond to each other is turned to a unlock state.

That is, when the spool cover 13a is rotate by the desired angle, the locking step 41 formed at the outer circumferential edge of the spool cover 13a escapes from the locking step (not shown) that is formed at the outside plate 24 of the reel body 11 to correspond to the locking step 41.

Figure 3:
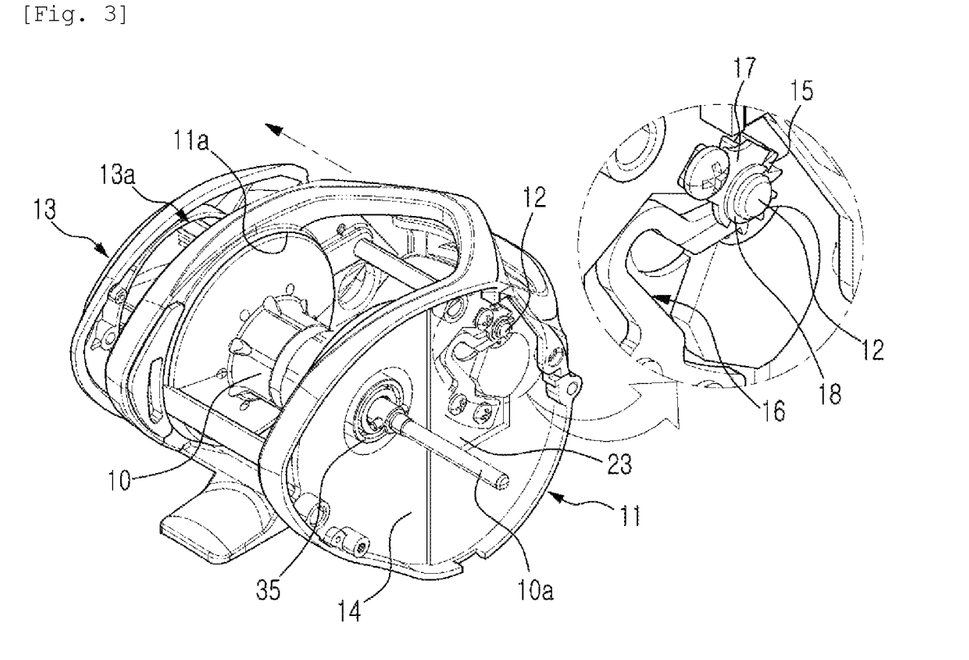
FIG. 3 is a view showing the bait cast reel of FIG. 2, wherein the palmside cover is separated from the reel body in a direction of a shaft of the reel body.
Figure 4:
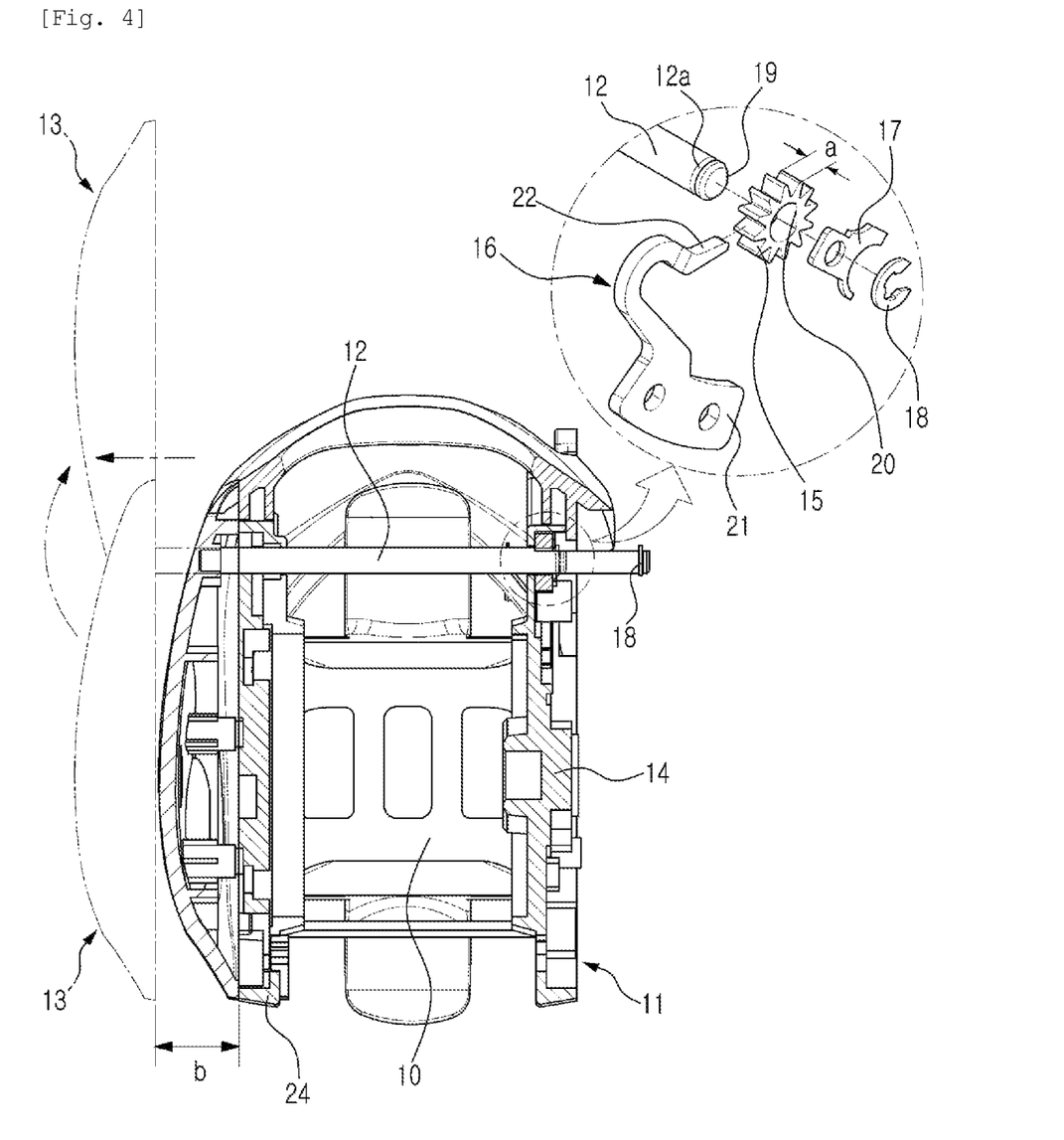
FIG. 4 is an exploded view showing a locking unit of the bait cast reel of FIG. 2, wherein the locking unit locks the palmside cover that is separable from the reel body to a desired position.
Figure 5:
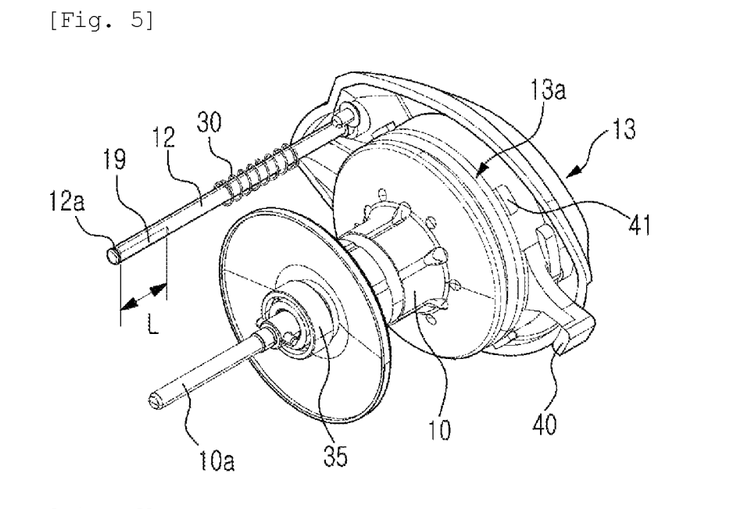
FIG. 5 is a view showing the palmside cover that is hinged to an opening of the reel body opening and closing of the bait cast reel of FIG. 2.

As shown in FIGS. 3 and 4, by the elastic restoring force of the elastic member 30 provided at the outer circumferential surface of the pillar insert 12 between the palmside cover 13 and the outside plate 24, the palmside cover 13 may be moved in the direction of the shaft of the reel body (that is, in left direction in drawings) from the first side opening 11a of the reel body 11 to be separated from the reel body 11 (specifically, the palmside cover 13 may perform reciprocating movement in left and right directions by a regular distance, by the pillar insert performing shaft directional movement while being not completely separated from the reel body 11).

As shown in FIG. 4, the palmside cover 13 that is separable from the reel body 11 performs rectilinear movement by the pillar insert 12 and by the elastic restoring force of the elastic member 30 so as to be spaced apart from the edge of the outside plate 24 by the predetermined gap (b). The retainer 18 seated on a groove 12a at the inside end of the pillar insert 12 prevents the pillar insert 12 from escaping from the inside plate 14.

As shown in FIGS. 3 and 4, when the palmside cover 13 is separated from the opening 11a of the reel body 11, the retainer 18, which is locked to the pillar insert 12 moved in the left direction (in drawings), is moved to a position close to an outside surface of the pillar click gear 15.

As shown in imaginary lines in FIG. 4, the palmside cover 13 is separated from the reel body 11 by the predetermined gap (b) by the pillar insert 12 moved in the left direction (in drawings). Then the palmside cover 13 is rotated in an upper direction (in the drawings) on the pillar insert 12. Thus, the spool 10 may be moved in the left direction (in drawings) and completely separated from the reel body 11 in which the opening 11a is opened.

More preferably, the palmside cover 13 that is hinged to the reel body 11 to open and close the first side opening 11a of the reel body 11 may be locked at a desired position while being rotated upward (in drawings).

Figure 6:
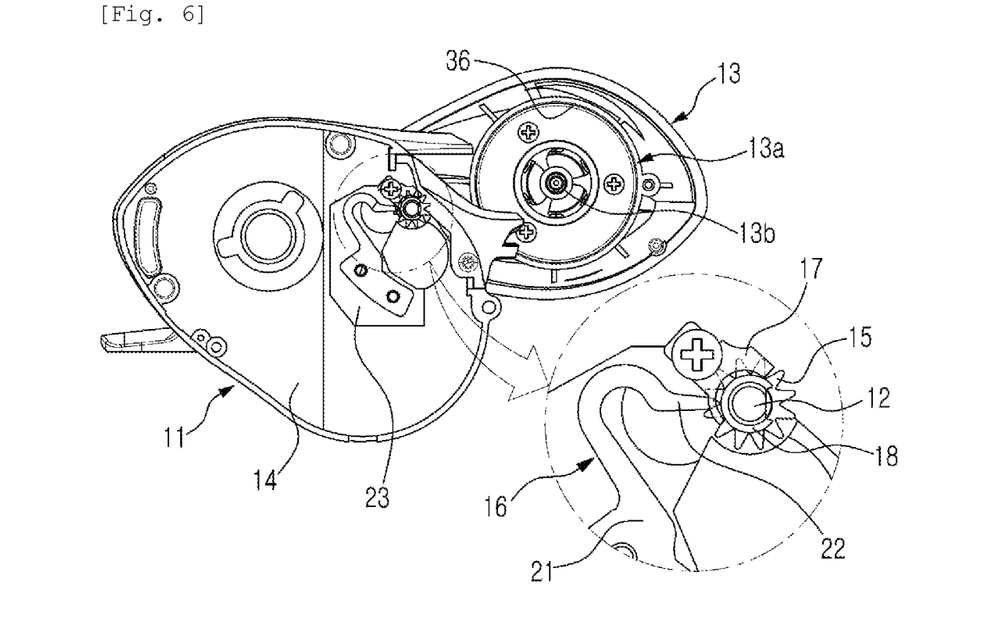
FIG. 6 is a view showing an operational state of the locking unit of FIG. 4.

Specifically, as shown in FIGS. 4 and 6, when the palmside cover 13 that is separable from the reel body 11 by the predetermined gap (b) is rotated on the pillar insert 12, the pillar click gear 15 coupled to the side cut portion 19 formed at the one side of the outer circumferential surface of the pillar insert 12 is rotated integrally therewith.

When the rotation of the palmside cover 13 is stopped, the tension portion 22 of the pillar click claw 16 is maintained in a state of being engaged between teeth at a predetermined section of the pillar click gear 15, the pillar click claw 16 being provided while the locked portion 21 is mounted to the inside plate 14 of the reel body 11.

As described above, when the palmside cover 13 that is separable from the opening 11a of the reel body 11 is rotated and then locked at the desired position, the tension portion 22 of the pillar click claw 16 in which the locked portion 21 is fixed to the inside plate 14 is maintained in the state of being engaged between the teeth at the predetermined section of the pillar click gear 15 coupled to the pillar insert 12. Accordingly, the palmside cover 13 fixed to the outside end of the pillar insert 12 may be locked at the desired position.

That is, when the palmside cover 13 is rotated, the tension portion 22 of the pillar click claw 16 is engaged with every portion between the teeth of the pillar click gear 15, so that the palmside cover 13 may be locked at every desired position.

Accordingly, as the palmside cover 13 that is separable from the opening 11a of the reel body 11 is rotated and locked at the desired position by engagement between the teeth of the pillar click gear 15 and the tension portion 22 of the pillar click claw 16, when the spool 10 coupled to the reel body 11 is separated therefrom so as to release backlash occurring during fishing or to replace a fishing line, the spool may be easily removed from the reel body 11 without interference with the palmside cover 13.

Meanwhile, as shown in FIG. 6, when the palmside cover 13 integrally coupled to the outside end of the pillar insert 12 is separated from the reel body 11 and then is rotated clockwise or counterclockwise, the tension portion 22 of the pillar click claw 16 is moved between the teeth of the pillar click gear 15 that is integrally fixed to the inside end of the pillar insert 12.

When the palmside cover 13 that is separable from the first side opening 11a of the reel body 11 by the predetermined gap (b) is rotated clockwise or counterclockwise, the tension portion 22 of the pillar click claw 16 is moved between the teeth of the pillar click gear 15 and generates the click sound.

Accordingly, during fishing, the user can acoustically check whether the palmside cover 13 is rotated by the desired angle by the click sound that is generated every time the palmside cover 13 that is separable from the opening 11a of the reel body 11 by the predetermined gap (b) is rotated.

Figure 2:
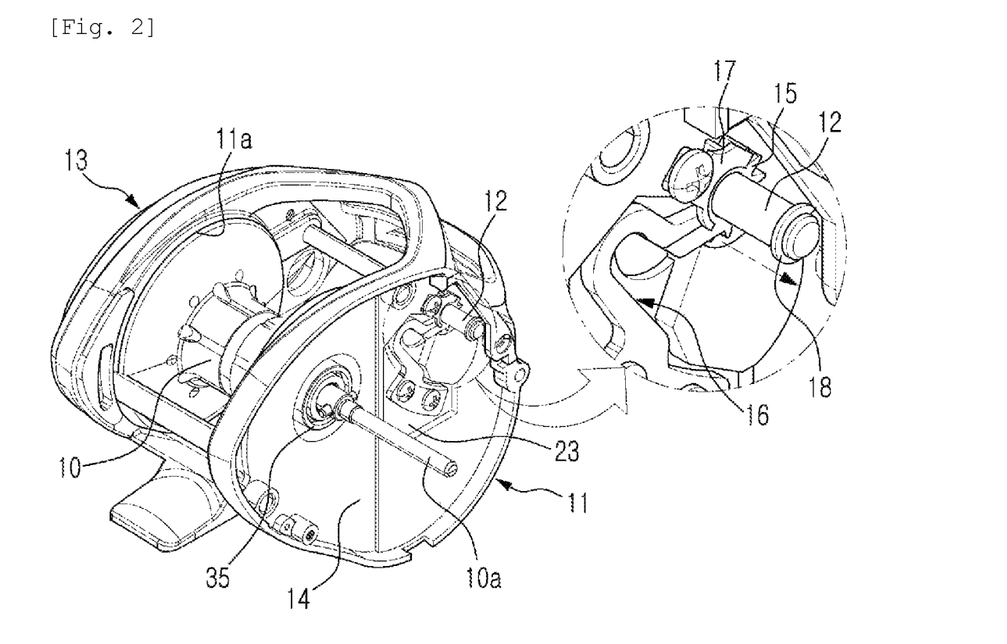
FIG. 2 is a view showing a bait cast reel having a locking part for a hinge-type palmside cover according to an exemplary embodiment of the present disclosure, wherein the palmside cover and a spool are coupled to a reel body.

Meanwhile, as shown in FIGS. 2 and 6, when the spool cover 13a of the palmside cover 13 performs the shaft directional movement so as to be coupled to the first side opening 11a of the reel body 11, the palmside cover 13 fixed to the pillar insert 12 performs the shaft directional movement in a right direction (in drawings).

That is, when the spool cover 13a is coupled to the opening 11a, as the locking lever 40 formed at the spool cover 13a is rotated by the desired angle, the locking step 41 formed at the outer circumferential edge of the spool cover 13a is locked to the locking step that is formed at the outside cover 24 of the reel body 11 to correspond to the locking step 41. Thus, the palmside cover 13 may be locked to the reel body 11.

A compressive force is applied to the elastic member 30 provided at the outer circumferential surface of the pillar insert 12 between the edge of the palmside cover 13 and the edge of the inside plate 14. Thus, the retainer 18 provided at the inside end of the pillar insert 12 is spaced apart from the outside surface of the pillar click gear 15.

When the pillar insert 12 performs the shaft directional movement to protrude from the inside plate 14, the pillar click gear 15 coupled to the side cut portion 19 of the pillar insert 12 is maintained in the locked state to the side cut portion 19 by the stopper 17 fixed to the inside plate 14. In addition, the pillar click gear 15 may be prevented from escaping from the fixed position to the inside plate 14 by the stopper 17.

When the pillar insert 12 performs the shaft directional movement to lock the palmside cover 13, to which the spool cover 13a is coupled, to the opening 11a of the reel body 11, there is no interference in the pillar click gear 15 coupled to the side cut portion 19 and in the stopper 17 that is coupled to the inside plate 14 and rotatably supports the pillar click gear 15 (that is, when the pillar insert 12 performs the shaft directional movement, the pillar click gear 15 and the stopper 17 are not moved).

Accordingly, when the pillar insert 12 performs the shaft directional movement in a predetermined section, an interference portion with an opposite component (for example, pillar click gear 15) coupled to the side cut portion 19 of the pillar insert 12 is minimized, so that provision of a separate space is not required.

Figure 7:
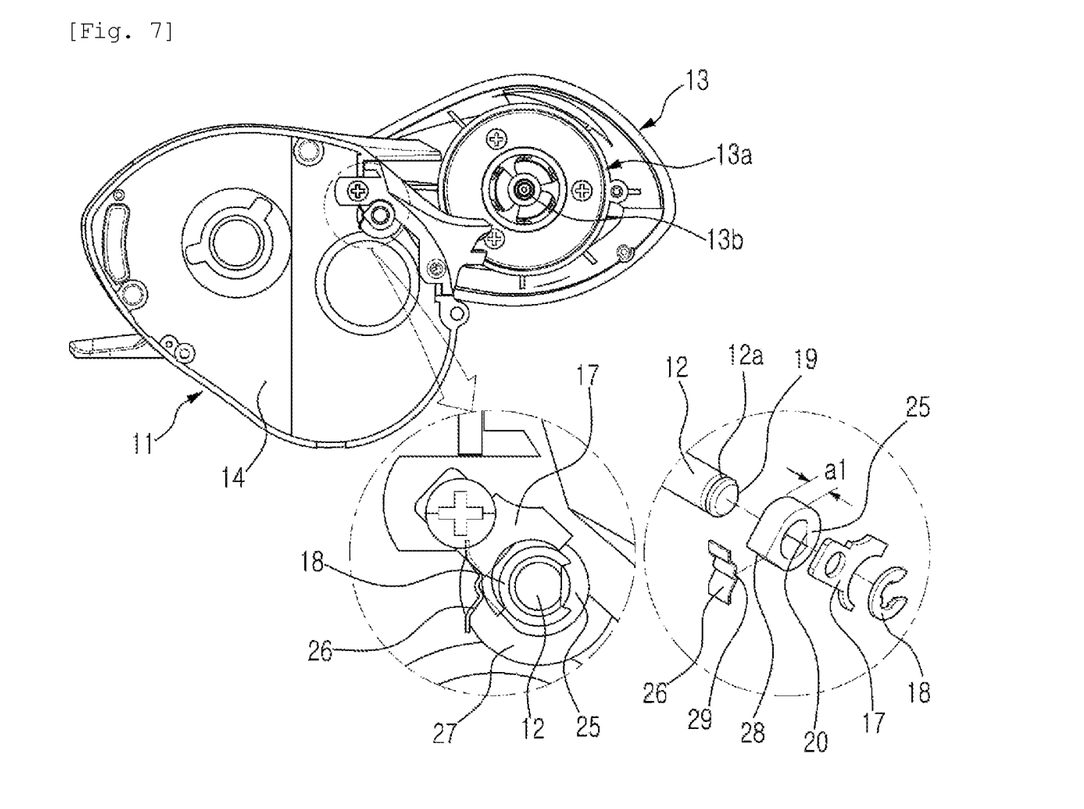
FIG. 7 is a view showing a bait cast reel having a locking part for a hinge-type palmside cover according to another exemplary embodiment of the present disclosure, wherein the palmside cover is coupled to the reel body.

Referring to FIG. 7, according to another embodiment of the present disclosure, the bait cast reel having the locking part for the hinge-type palmside cover 13 includes the reel body 11 in which the spool 10 on which the fishing line is wound/unwound is rotatably installed by the bearing 35 supporting the spool shaft 10a.

The bait cast reel includes the palmside cover 13. The palmside cover 13 is fixed to the outside end of the shaft-shaped pillar insert 12 that is rotatably coupled to the reel body 11 and is moved in the direction of the shaft of the reel body 11, and the palmside cover 13 is hinged to the reel body to open and close the first side opening 11a. In addition, the palmside cover 13 has the bearing at the center thereof so as to rotatably support the outside end of the spool shaft 10a, and has the spool cover 13a therein. Wherein, the spool cover 13a has the locking step 41, which is detachably locked to and released from the locking step (not shown) of the outside plate 24 of the reel body 11, at the outer circumferential edge of the spool cover 13a in the circumferential direction thereof, when the palmside cover 13 is rotated by the desired angle by manipulating the locking lever 40 extending from the outer circumferential edge of the spool cover 13a.

The bait cast reel includes the spool cover 13a that is mounted to the palmside cover 13 and has the brake ring 36 therein.

The bait cast reel includes the centrifugal brake (not shown). The centrifugal brake is integrally coupled to the spool shaft 10a in a spline manner and is moved radially by the centrifugal force generated when the spool 10 is rotated. Thus, as the brake ring 36 comes into contact with the plurality of brake shoes (not shown), the centrifugal brake controls a rotation speed of the spool 10 by the friction force between the brake ring 36 and the brake shoes.

The bait cast reel includes a pillar locker 25. Wherein, the pillar insert 12 is coupled to the pillar locker 25 to be moveable in the direction of the shaft of the reel body. The pillar locker 25 is rotatably mounted to the inside plate 14 of the reel body 11 integrally with the pillar insert 12.

The bait cast reel includes a locking plate 26. The locking plate 26 is mounted to the inside plate 14 and stops the rotation of the pillar locker 25, so that the palmside cover 13 that is separable from the first side opening 11a of the reel body 11 is rotated and then locked at the desired position.

The bait cast reel includes the stopper 17 mounted to the inside plate 14 to support the pillar locker 25 for rotation of the pillar locker 25. When the palmside cover 13 coupled to the first side opening 11a of the reel body 11 is locked, the stopper 17 may prevents the pillar locker 25 from escaping from the fixed position.

According to the another exemplary embodiment, the bait cast reel includes a second receiving groove 27 formed at the inside plate 14 to receive the pillar locker 25, the locking plate 26, and the stopper 17. Thus, it is possible to minimize interference with the pillar locker 25, the locking plate 26, and the stopper 17, when the side cover (not shown) having the tension control knob for controlling the tension force of the spool 10 is mounted to the inside plate 14.

The above-described pillar locker 25 has a cam shape having a wedge portion 28 at one side of an outside surface thereof.

The locking plate 26 is mounted to an desired position at the inside plate 14 to be moved in a pitchable manner, so that the palmside cover 13 may be locked at a position separated from the first side opening of the reel body 11. In addition, the locking plate 26 is configured as a flat spring that is elastically deformed when the wedge portion 28 of the pillar locker 25 is attached to and detached from a locking groove 29.

A length (L) of the above-described side cut portion 19 formed at the pillar insert 12 is a size of adding a thickness (a1) of the pillar locker 25 coupled to the pillar insert 12 and the gap (b) corresponding to the perpendicular distance between the edge of the palmside cover 13 and the edge of the outside plate 24 of the reel body 11 in a state when the palmside cover 13 is separated from the first side opening 11a of the reel body 11 (L=a1+b).

When the length (L) of the above-described side cut portion 19 is larger than the size of adding the thickness (a1) of the pillar locker 25 and the gap (b) corresponding to the perpendicular distance between the edge of the palmside cover 13 and the edge of the outside plate 24 (L > (a1+b)), when the user reels a fishing line onto the spool 10 by rotating the handle, there is interference in the reciprocating movement of the level winder (not shown) that aligns the fishing line by performing the reciprocating movement along the pillar insert 12.

In the another embodiment, the configurations of the bait cast reel are the same as the configurations of the bait cast reel having the locking part for the hinge-type palmside cover 13 according to the embodiment of the present disclosure, except the pillar locker 25 having the cam shape and rotated integrally with the pillar insert 12 by the engagement between the side cut portion 19 formed at the inside end of the pillar insert 12 that is coupled to the reel body 11 to be moveable in the direction of the shaft of the reel body and the flat portion 20 formed at an inner circumferential surface of the pillar locker 25 to correspond to the side cut portion 19; and the locking plate 26 mounted to the inside plate 14, so that the palmside cover 13 that is separable from the opening 11a of the reel body 11 is rotated and then locked at the desired position, and having a shape of the flat spring with the locking groove 29 to which the wedge portion 28 of the pillar locker 25 is detachably locked, and thus detailed descriptions thereof will be omitted and the same reference numerals mean the same configurations.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A bait cast reel having a locking part, the bait cast reel comprising:
   a reel body in which a spool on which a fishing line is wound/unwound is rotatably provided;
   a palmside cover fixed to an outside end of a pillar insert that is rotatably coupled to the reel body and is moved in a direction of a shaft of the reel body, the palmside cover being hinged to the reel body to open and close a first side opening of the reel body;
   a spool cover that is mounted to the palmside cover and has a brake ring therein;
   a centrifugal brake that is integrally coupled to a spool shaft and controls a rotation speed of the spool by a plurality of brake shoes that is moved radially by a centrifugal force, which is generated when the spool is rotated, to come into contact with the brake ring;
   a pillar click gear to which the pillar insert is coupled in a moveable manner in the direction of the shaft of the reel body, the pillar click gear being rotatably mounted to an inside plate of the reel body integrally with the pillar insert;
   a pillar click claw that is mounted to the inside plate of the reel body and stops rotation of the pillar click gear so that the palmside cover that is separable from the first side opening of the reel body is rotated and then locked at a desired position; and a stopper that is mounted to the inside plate of the reel body to support the pillar click gear for rotation of the pillar click gear, wherein, when the palmside cover coupled to the first side opening of the reel body is locked, the stopper prevents the pillar click gear from escaping from a fixed position.

2. The bait cast reel of claim 1, further comprising:
a retainer that is mounted to an inside end of the pillar insert and prevents the pillar insert from escaping from the inside plate of the reel body, when the palmside cover is separated from the first side opening of the reel body.

3. The bait cast reel of claim 1, further comprising:
a side cut portion formed at one side of an outer circumferential surface of the pillar insert; and
a flat portion formed at an inner circumferential surface of the pillar click gear or a pillar locker to correspond to the side cut portion.

4. The bait cast reel of claim 1, wherein the pillar click claw includes a locked portion mounted to the inside plate of the reel body and a tension portion extending from one end of the locked portion and elastically deformed to be attached to and detached from between gear teeth of the pillar click gear due to rotation of the palmside cover, and
when the palmside cover that is separable from the first side opening of the reel body is rotated, a click sound is generated every time the tension portion of the pillar click claw is attached to and detached from between the gear teeth of the pillar click gear.

5. A bait cast reel having a locking part, the bait cast reel comprising:
a reel body in which a spool on which a fishing line is wound/unwound is rotatably provided;
a palmside cover that is moved in a direction of a shaft of the reel body, is fixed to an outside end of a pillar insert rotatably coupled to the reel body, and is hinged to the reel body to open and close first side opening of the reel body;
a spool cover that is mounted to the palmside cover and has a brake ring therein;
a centrifugal brake that is integrally coupled to a spool shaft and is for controlling a rotation speed of the spool by a plurality of brake shoes that is moved radially by a centrifugal force, which is generated when the spool is rotated, to come into contact with the brake ring;
a pillar locker to which the pillar insert is coupled in a moveable manner in the direction of the shaft of the reel body and the pillar locker rotatably mounted to an inside plate of the reel body integrally with the pillar insert;
a locking plate that is mounted to the inside plate of the reel body and stops rotation of the pillar locker so that the palmside cover that is separable from the first side opening of the reel body is rotated and then locked at a desired position; and
a stopper that is mounted to the inside plate of the reel body to support the pillar locker for rotation of the pillar locker, wherein, when the palmside cover coupled to the first side opening of the reel body is locked, the stopper prevents the pillar locker from escaping from a fixed position.

6. The bait cast reel of claim 5, wherein the pillar locker is formed in a cam shape having a wedge portion at one side of an outside surface thereof, and
the locking plate is mounted to a desired position at the inside plate of the reel body to be moved in a pitchable manner, so that the palmside cover is locked at a position separated from the first side opening of the reel body, and the locking plate is configured as a flat spring that is elastically deformed when the wedge portion of the pillar locker is attached to and detached from a locking groove of the flat spring.

7. The bait cast reel of claim 5, further comprising:
a retainer that is mounted to an inside end of the pillar insert and prevents the pillar insert from escaping from the inside plate of the reel body, when the palmside cover is separated from the first side opening of the reel body.

8. The bait cast reel of claim 5, further comprising:
a side cut portion formed at one side of an outer circumferential surface of the pillar insert; and
a flat portion formed at an inner circumferential surface of a pillar click gear or
the pillar locker to correspond to the side cut portion.

\* \* \* \* \*